US011063879B2

(12) United States Patent
Zhang et al.

(10) Patent No.: US 11,063,879 B2
(45) Date of Patent: Jul. 13, 2021

(54) DETERMINING A RECEIVE WINDOW OF A RECEIVING DEVICE THAT REDUCES BUFFERBLOAT IN A WIRELESS COMMUNICATIONS SYSTEM, SUCH AS THAT CAUSED BY TCP DYNAMICS OVER MILLIMETER WAVE LINKS

(71) Applicant: New York University, New York, NY (US)

(72) Inventors: Menglei Zhang, Brooklyn, NY (US); Marco Mezzavilla, Brooklyn, NY (US); Sundeep Rangan, Jersey City, NJ (US); Shivendra S. Panwar, Freehold, NJ (US)

(73) Assignee: New York University, New York, NY (US)

(*) Notice: Subject to any disclaimer, the term of this patent is extended or adjusted under 35 U.S.C. 154(b) by 358 days.

(21) Appl. No.: 15/952,116

(22) Filed: Apr. 12, 2018

(65) Prior Publication Data
US 2018/0302333 A1 Oct. 18, 2018

Related U.S. Application Data

(60) Provisional application No. 62/484,453, filed on Apr. 12, 2017.

(51) Int. Cl.
*H04L 12/875* (2013.01)
*H04L 12/807* (2013.01)
(Continued)

(52) U.S. Cl.
CPC ............ *H04L 47/564* (2013.01); *H04L 47/27* (2013.01); *H04L 47/283* (2013.01); *H04L 47/30* (2013.01);
(Continued)

(58) Field of Classification Search
CPC . H04L 47/564; H04L 47/283; H04L 49/9005; H04L 47/30; H04L 47/27; H04W 28/0205
(Continued)

(56) References Cited

U.S. PATENT DOCUMENTS

2006/0133428 A1* 6/2006 Guthrie ............... H04L 43/0858
370/519
2010/0131669 A1* 5/2010 Srinivas ................ G06F 9/5044
709/233
(Continued)

*Primary Examiner* — Kwang B Yao
*Assistant Examiner* — Syed M Bokhari
(74) *Attorney, Agent, or Firm* — John C. Pokotylo; Pokotylo Patent Services (57) ABSTRACT

Due to massive available spectrum in the millimeter wave (mmWave) bands, cellular systems in these frequencies may provide orders of magnitude greater capacity than networks in conventional lower frequency bands. However, due to high susceptibility to blocking, mmWave links can be extremely intermittent in quality. This combination of high peak throughputs and intermittency can cause significant challenges in end-to-end transport-layer mechanisms such as TCP, such as the challenging problem of bufferbloat. Specifically, with current buffering and congestion control mechanisms, high throughput-high variable links can lead to excessive buffers incurring long latency. A dynamic receive window approach addresses the problem of bufferbloat.

22 Claims, 6 Drawing Sheets

(51) Int. Cl.
*H04L 12/835* (2013.01)
*H04L 12/861* (2013.01)
*H04L 12/841* (2013.01)
*H04W 28/02* (2009.01)

(52) U.S. Cl.
CPC ..... *H04L 49/9005* (2013.01); *H04W 28/0205* (2013.01)

(58) Field of Classification Search
USPC ................ 370/412, 329, 235, 230, 233, 336
See application file for complete search history.

(56) References Cited

U.S. PATENT DOCUMENTS

| | | | |
|---|---|---|---|
| 2012/0106342 A1* | 5/2012 | Sundararajan | H04L 47/193 370/235 |
| 2012/0140621 A1* | 6/2012 | Wu | H04L 69/163 370/230 |
| 2014/0241163 A1* | 8/2014 | Lee | H04L 41/0896 370/235 |
| 2015/0334025 A1* | 11/2015 | Rader | H04L 47/193 709/233 |
| 2016/0066335 A1* | 3/2016 | Clevorn | H04W 72/085 370/329 |
| 2016/0081076 A1* | 3/2016 | Zhang | H04L 5/0035 370/336 |
| 2018/0070263 A1* | 3/2018 | Falconetti | H04L 47/37 |
| 2019/0052418 A1* | 2/2019 | Li | H03M 13/13 |

* cited by examiner

DETERMINING A RECEIVE WINDOW OF A RECEIVING DEVICE THAT REDUCES BUFFERBLOAT IN A WIRELESS COMMUNICATIONS SYSTEM, SUCH AS THAT CAUSED BY TCP DYNAMICS OVER MILLIMETER WAVE LINKS

RELATED APPLICATION(S)

This application claims the benefit of U.S. Provisional Patent Application Ser. No. 62/484,453 (referred to as "the '453 provisional" and incorporated herein by reference), filed on Apr. 12, 2017, titled "TCP Dynamics over mmWave Links" and listing Menglei ZHANG, Marco MEZZAVILLA, Sundeep RANGAN and Shivendra PANWAR as the inventors. Each of the references cited in the '453 provisional is incorporated herein by reference. The present invention is not limited to requirements of the particular embodiments described in the '453 provisional.

GOVERNMENT LICENSE RIGHTS

This invention was made with government support under grant numbers 1302336, 1564142, 1547332, 1619129, 1320472, 1555332 awarded by the National Science Foundation ("NSF"). The government has certain rights in the invention.

BACKGROUND OF THE INVENTION

Field of the Invention

The present description concerns wireless communications. More specifically, the present description concerns controlling wireless communications to reduce bufferbloat.

Background Information

Millimeter Wave Communications

The millimeter wave (mmWave) bands—roughly corresponding to frequencies above 10 GHz—have attracted considerable attention for next-generation cellular wireless systems. (See, e.g., the articles: F. Khan and Z. Pi, "An Introduction to Millimeter-Wave Mobile Broadband Systems," *IEEE Commun. Mag.*, vol. 49, no. 6, pp. 101-107 (June 2011); T. S. Rappaport, S. Sun, R. Mayzus, H. Zhao, Y. Azar, K. Wang, G. N. Wong, J. K. Schulz, M. Samimi, and F. Gutierrez, "Millimeter Wave Mobile Communications for 5G Cellular: It Will Work!" *IEEE Access*, vol. 1, pp. 335-349 (May 2013); S. Rangan, T. S. Rappaport, and E. Erkip, "Millimeter-Wave Cellular Wireless Networks: Potentials and Challenges," *Proc. IEEE*, vol. 102, no. 3, pp. 366-385 (March 2014); J. Andrews, S. Buzzi, W. Choi, S. Hanly, A. Lozano, A. Soong, and J. Zhang, "What will 5G be?" *IEEE J. Sel. Areas Commun.*, vol. 32, no. 6, pp. 1065-1082 (June 2014); and A. Ghosh, T. A. Thomas, M. C. Cudak, R. Ratasuk, P. Moorut, F. W. Vook, T. S. Rappaport, G. MacCartney, S. Sun, and S. Nie, "Millimeter Wave Enhanced Local Area Systems: A High Data Rate Approach for Future Wireless Networks," *IEEE J. Sel. Areas Commun.*, vol. 32, no. 6, pp. 1152-1163 (June 2014), each of which is incorporated herein by reference.) The mmWave bands offer orders of magnitude more spectrum than conventional cellular frequencies below 3 GHz—up to 200 times by some estimates. (See, e.g., the article, F. Khan and Z. Pi, "An Introduction to Millimeter-Wave Mobile Broadband Systems," *IEEE Commun. Mag.*, vol. 49, no. 6, pp. 101-107 (June 2011), incorporated herein by reference.) The massive bandwidth can be combined with the large number of spatial degrees of freedom available in high-dimensional antenna arrays to enable cellular systems with orders of magnitude greater capacity. (See, e.g., the articles: M. Akdeniz, Y. Liu, M. Samimi, S. Sun, S. Rangan, T. Rappaport, and E. Erkip, "Millimeter Wave Channel Modeling and Cellular Capacity Evaluation," *IEEE J. Sel. Areas Commun.*, vol. 32, no. 6, pp. 1164-1179 (June 2014); T. Bai and R. Heath, "Coverage and Rate Analysis for Millimeter-Wave Cellular Networks," *IEEE Trans. Wireless Commun.*, vol. 14, no. 2, pp. 1100-1114 (February 2015); and D. E. Berraki, S. M. D. Armour, and A. R. Nix, "Codebook Based Beamforming and Multiuser Scheduling Scheme for Mmwave Outdoor Cellular Systems in the 28, 38 and 60 GHz Bands," *IEEE Globecom Workshops (GC Wkshps)*, pp. 382-387 (December 2014), each of which is incorporated herein by reference.)

However, mmWave links are likely to have highly variable quality. MmWave signals are completely blocked by many common building materials such as brick and mortar (See, e.g., the articles, F. Khan and Z. Pi, "An Introduction to Millimeter-Wave Mobile Broadband Systems," *IEEE Commun. Mag.*, vol. 49, no. 6, pp. 101-107 (June 2011); K. Allen et al., Building Penetration Loss Measurements at 900 MHz, 11.4 GHz, and 28.8 MHz, ser. NTIA report—94-306. Boulder, Colo.: U.S. Dept. of Commerce, National Telecommunications and Information Administration (1994); C. R. Anderson and T. S. Rappaport, "In-Building Wideband Partition Loss Measurements at 2.5 and 60 GHz," *IEEE Transactions on Wireless Communications*, vol. 3, no. 3, pp. 922-928 (May 2004); A. Alejos, M. Sanchez, and I. Cuinas, "Measurement and Analysis of Propagation Mechanisms at 40 Ghz: Viability of Site Shielding Forced By Obstacles," *IEEE Trans. Vehicular Technology*, vol. 57, no. 6, pp. 3369-3380 (November 2008); S. Singh, F. Ziliotto, U. Madhow, E. M. Belding, and M. J. Rodwell, "Millimeter wave WPAN: Cross-Layer Modeling and Multi-Hop Architecture," *Proc. IEEE INFOCOM*, 2007, pp. 2336-2340; H. Zhao, R. Mayzus, S. Sun, M. Samimi, J. K. Schulz, Y. Azar, K. Wang, G. N. Wong, F. Gutierrez, and T. S. Rappaport, "28 GHz Millimeter Wave Cellular Communication Measurements for Reflection and Penetration Loss In and Around Buildings in New York City," *Proc. IEEE ICC* (June 2013), each of which is incorporated herein by reference.), and even the human body can cause up to 35 dB of attenuation. (See, e.g., J. S. Lu, D. Steinbach, P. Cabrol, and P. Pietraski, "Modeling Human Blockers in Millimeter Wave Radio Links," *ZTE Communications*, vol. 10, no. 4, pp. 23-28 (December 2012), incorporated herein by reference.) As a result, the movement of obstacles and reflectors, or even changes in the orientation of a handset relative to the body or a hand, can cause the channel to rapidly appear or disappear.

Consequently, mmWave signals have the unique feature of having extremely high peak rates combined with high variability. This combination is extremely challenging when viewed from an end-to-end perspective. (See, e.g., M. Zhang, M. Mezzavilla, R. Ford, S. Rangan, S. Panwar, E. Mellios, D. Kong, A. Nix, and M. Zorzi, "Transport Layer Performance In 5G mmwave Cellular," *IEEE Infocom Millimeter Wave Networking Workshop* (April 2016), incorporated herein by reference.) Specifically, transport layer mechanisms and buffering should be able to rapidly adapt to the link capacities that can dramatically change. Failure to do so can lead to a particularly important problem referred to as "bufferbloat."

The Problem of Bufferbloat

As used in the present description, bufferbloat is triggered by persistently filled or full buffers, and usually results in long latency, and/or packet drops. This phenomenon was first pointed out in late 2010. (See, e.g., J. Gettys and K. Nichols, "Bufferbloat: Dark Buffers in the Internet," *Queue*, vol. 9, no. 11, p. 40 (November 2011), incorporated herein by reference.) Optimal buffer sizes should equal the bandwidth delay product (BDP). However, as the delay is usually hard to estimate, larger buffers are deployed to prevent losses. Even though such oversized buffers prevent packet loss, overall performance will likely degrade nonetheless, especially when transmitting TCP flows. (Note that TCP carries almost 90% of the internet traffic. (See, e.g., K.-c. Lan and J. Heidemann, "A Measurement Study of Correlations of Internet Flow Characteristics," *Computer Networks*, vol. 50, no. 1, pp. 46-62 (January 2006), incorporated herein by reference.) Originally, TCP was designed to react and adjust its sending rate based on timely congestion notifications (e.g., as a function of the packet drop rate). However, using an oversized buffer conceals congestion from TCP, resulting in high sending window values, which determine the maximum packets that can be send out without acknowledgments (ACKs), also called "packets in-flight." Using oversized buffers can begin to cause problems when the sending window grows beyond capacity, thus generating buffering delays.

The present inventors had previously shown that sending TCP packets over intermittent and high peak capacity mmWave links resulted in (i) severe latency trends with large buffers, and (ii) low throughput due to TCP retransmissions with small buffers. (Recall, e.g., M. Zhang, M. Mezzavilla, R. Ford, S. Rangan, S. Panwar, E. Mellios, D. Kong, A. Nix, and M. Zorzi, "Transport Layer Performance In 5G mmwave Cellular," *IEEE Infocom Millimeter Wave Networking Workshop* (April 2016), incorporated herein by reference.)

The following challenges exist when using mmWave for wireless communications. It is well known that the mmWave channel usually has large bandwidth, and can support very high (Multi-Gbps) data rate, especially with Line-of-Sight (LoS). On the other hand, due to end-to-end ("e2e") congestion control, the throughput of a TCP connection is limited by TCP send window size, as well as round trip time. In cellular systems, the round trip time (RTT) may be large due to the need to route through the core network to a packet gateway. Thus, to fully utilize the mmWave channel, it is important for the TCP transmitter to maintain a very large TCP send window. Assume, for example, data rate=3 Gbps and RTT=40 ms, leading to the BDP of 15 MB. As a result, the TCP send window must always stay above 15 MB in order to achieve the maximum e2e throughput. However, when packet loss occurs (e.g., due to congestion or any other reason), the TCP sender will trigger congestion avoidance and reduce its send window by half. Afterwards, it takes one RTT for the send window to increase by 1 segment. If one TCP segment is 1K bytes long, it will take 40 seconds to increase TCP send window by 1 MB! For example, if the TCP send window is 10 MB when congestion happens, it will take 200 seconds for the TCP send window to increase from 10 MB to 15 MB, large enough to achieve the maximize e2e throughput. As this example illustrates, it is challenging to fully utilize a multi-Gbps mmWave channel with TCP traffic.

The problem is made particularly important due to the variability of the channel. As mentioned above, mmWave links can rapidly change in quality. The TCP window will thus need to rapidly increase or decrease to track the channel fluctuations and maintain an appropriate window size. Otherwise, buffers can either bloat or have a queue underflow.

Active Queue Management (AQM)

Typical queue management techniques involve single queue, first in first out (FIFO) and drop-tail. With drop-tail, when buffer is full, the most recently received packets are dropped, regardless of their source or destination). Even though drop-tail is easy to manage, it may cause unnecessary delay—as the queue is building up, the round trip time (RTT) also increases.

Active queue management (AQM) schemes provide promising solutions to address the bufferbloat issue in wireless networks. AQM reacts to congestion much faster, by dropping packets when operating at certain regimes, to mitigate the increased latency effect. Some early AQM, such as random early detection (RED) (See, e.g., S. Floyd and V. Jacobson, "Random Early Detection Gateways for Congestion Avoidance," *IEEE/ACM Transactions on Networking*, vol. 1, no. 4, pp. 397-413, (1993), incorporated herein by reference.), were widely studied in the literature, but failed to find market traction (likely because of the intrinsic complexity of its tuning parameters). Recently, a simpler AQM technique, namely CoDel (See, e.g., K. Nichols and V. Jacobson, "Controlling Queue Delay," *Communications of the ACM*, vol. 55, no. 7, pp. 42-50 (2012), incorporated herein by reference.), was proposed to replace RED queues, and adapt to dynamic link rates without parameter configuration. CoDel can discriminate "good" and "bad" queues: good queues can quickly empty the buffer, whereas "bad" queues persistently buffer packets. CoDel works by monitoring the minimum queue packets-in-flight delay in every 100 ms interval (This is a default parameter that can be changed. The author claimed that these parameters are optimal over any link.), and only drop packets when the minimum queue delay is more than 5 ms.

The '453 provisional compared the performance of drop-tail and CoDel queues in two scenarios; namely where a mobile user equipment (UE) is experiencing blockages from (a) other humans or (b) buildings. The main difference is that, with humans, the channel deteriorates slowly and the blockage lasts a short interval. On the other hand, with buildings, the link capacity drops rapidly and the blocking interval is much longer. These trends are captured in FIGS. 1 and 2, respectively, of the '453 provisional. The '453 provisional discusses limitations with drop-tail and CoDel.

Dynamic Receive Window

Before implementing any congestion control, senders used to inject packets into the network as demanded. These unregulated flows seriously damaged the network performance, given that packets would be buffered at the bottleneck link router, resulting in large queueing delays and buffer saturation.

The TCP protocol was introduced to solve this issue by letting the sender slowly probing the available bandwidth and regulating the sending rate. The amount of data delivered by the sender is equal to:

$$\min(CW; RW),$$

where CW is the congestion window (i.e., the amount of bytes/packets in flight without ACKs) is determined at the transmitter side—which is based on the TCP variant, and RW instead represents the receive window (i.e., the available receive buffer size piggybacked to the sender).

Currently, the receive buffer size has become relatively large and is almost never limiting the sending rate. A recent work (See, e.g., H. Jiang, Z. Liu, Y. Wang, K. Lee, and I. Rhee, "Understanding Bufferbloat in Cellular Networks," in *Proceedings of the* 2012 *ACM SIGCOMM Workshop on Cellular Networks: Operations, Challenges, and Future Design*, ACM, 2012, pp. 1-6, incorporated herein by reference.) shows that some mobile devices select different RW values based on the connected network instead of sending back the available buffer size. For example, if it connects to Wi-Fi, a large RW size is used, but as it hands over to cellular, smaller RW values are selected.

The authors in the articles: H. Jiang, Y. Wang, K. Lee, and I. Rhee, "Tackling Bufferbloat in 3G/4G Networks," in *Proceedings of the* 2012 *ACM Conference on Internet Measurement Conference*, ACM, 2012, pp. 329-342; and X. Liu, F. Ren, R. Shu, T. Zhang, and T. Dai, "Mitigating Bufferbloat With Receiver-Based TCP Flow Control Mechanism in Cellular Networks," available online from Tsinghua University (each of which is incorporated herein by reference) showed that informing the sender with the optimal RW substantially reduces latency without deteriorating the throughput. Further, as all the changes are made at the receiver side, this approach can be easily deployed. With dynamic receive window Adjustment (DRWA) (See, e.g., H. Jiang, Y. Wang, K. Lee, and I. Rhee, "Tackling Bufferbloat in 3G/4G Networks," *Proceedings of the* 2012 *ACM Conference on Internet Measurement Conference*, ACM, 2012, pp. 329-342, incorporated herein by reference.), the RW is only based on the RTT; it does not exploit channel information. On the other hand, available bandwidth-based receiver window dynamic adjustment (ABRWDA) (See, e.g., X. Liu, F. Ren, R. Shu, T. Zhang, and T. Dai, "Mitigating Bufferbloat With Receiver-Based TCP Flow Control Mechanism in Cellular Networks," incorporated herein by reference.) encapsulates the wireless link capacity while feeding information back to the sender. Unfortunately, however, because some wireless resources are reserved for broadcasting, control messages, pilots, etc., the actual wireless link capacity overestimates the available data rate. Even though selecting larger RW values never reduces the utilization in current networks, multi-Gbps pipes introduced at mmWave bands will suffer from large delay. Further, even if the receiver may be able to extract the precise capacity for data, this value is still overestimated when the channel is shared by multiple UEs.

Thus, there is a need to improve existing dynamic receive window (DRW) based congestion control techniques.

SUMMARY OF THE INVENTION

Problems and limitations of existing DRW-based congestion control techniques are addressed by providing an improved DRW-based congestion control technique in which an estimate of the available capacity is improved which, in turn, leads to an improved RW estimation, which equals the optimal bandwidth-delay product. One example improved DRW-based congestion control method is for use in a wireless communications system including a receiving device, a sending device, and a communications network including a base station in wireless communication with the receiving device over a wireless communications channel, and determines a receive window of the receiving device that reduces bufferbloat in the wireless communications system. The example the method includes: (a) determining or inferring a maximum achievable throughput of the wireless communications channel; (b) determining or inferring a current available throughput of the wireless communications channel for the receiving device; (c) determining or inferring information about delay between the receiving device and the sending device; and (d) determining the receive window of the receiving device using (1) the determined or inferred maximum achievable throughput of the wireless communications channel, (2) the determined or inferred current available throughput of the wireless communications channel for the receiving device, and (3) determined or inferred information about delay between the receiving device and the sending device.

DETAILED DESCRIPTION

The present invention may involve novel methods, apparatus, message formats, and/or data structures for providing improved DRW-based congestion control. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Definitions and Acronyms

AQM: Active Queue Management
DRW: Dynamic Receive Window
CW: Congestion Window
RTT: Round Trip Time
RW: Receive Window
UE: User Equipment

Example Environment

Figure 1:
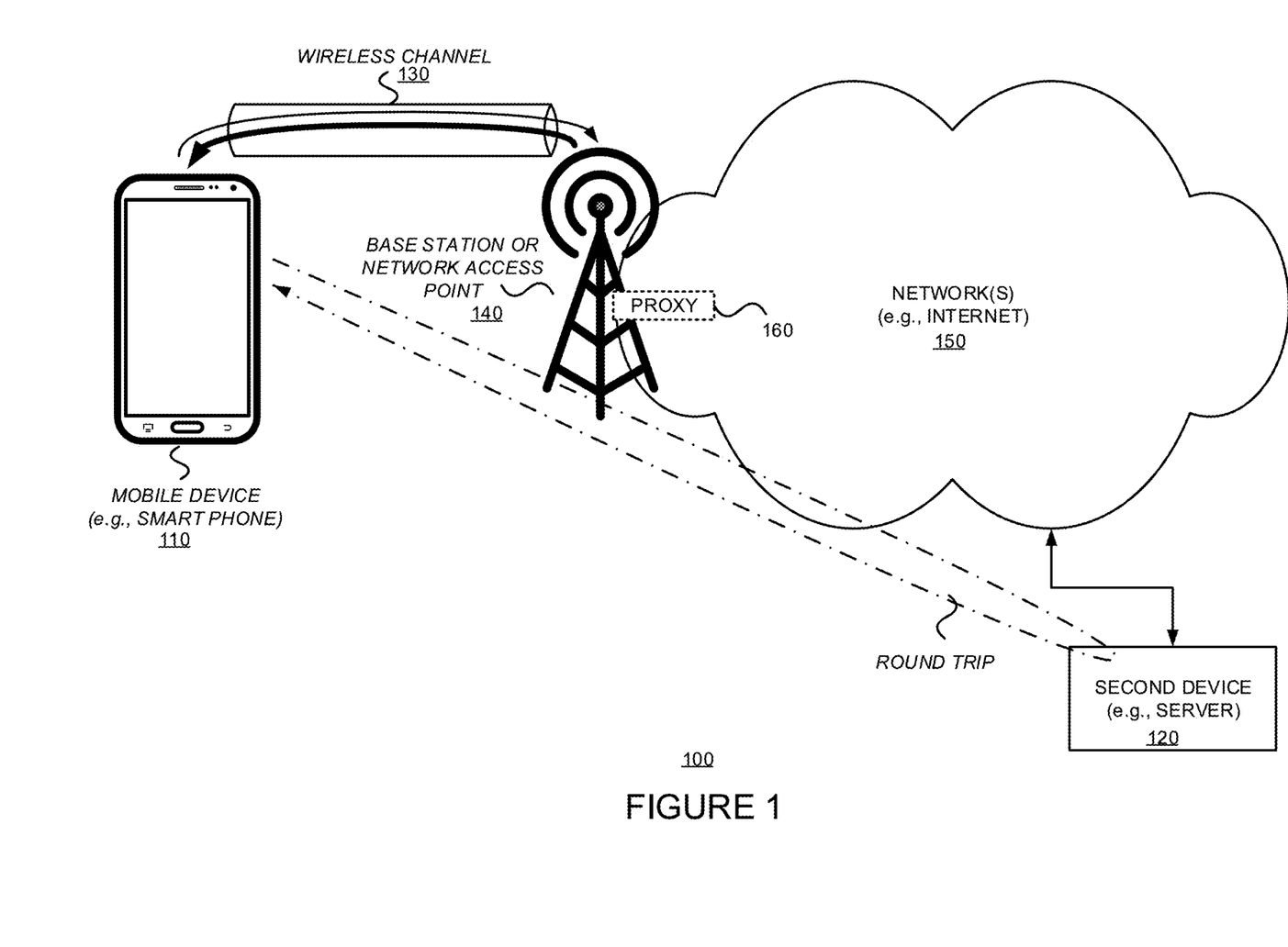
FIG. 1 illustrates an example environment in which example embodiments consistent with the present description may operate.

FIG. 1 illustrates an example environment 100 in which example embodiments consistent with the present description may operate. The example system 100 may include a mobile device (such as a smart phone, a tablet, etc.) 110 that communicates with a second device (e.g., a server that may serve content to the mobile device 110) 120 via a base station 140 and one or more apparatus (e.g., switches, routers, etc., not shown) in one or more networks (e.g., the Internet) 150. As shown, the mobile device 110 communicates with the base station 140 via a wireless communications channel 130. The dot-dashed arc shows a round trip communication from the mobile device 110 to the second device 120, via the base station 140, and back from the second device 120 to the mobile device 110, again via the base station 140. In some example embodiments, a proxy device (e.g., a server) 160 may be provided at, or close to, the base station.

Example Methods

Figure 2:
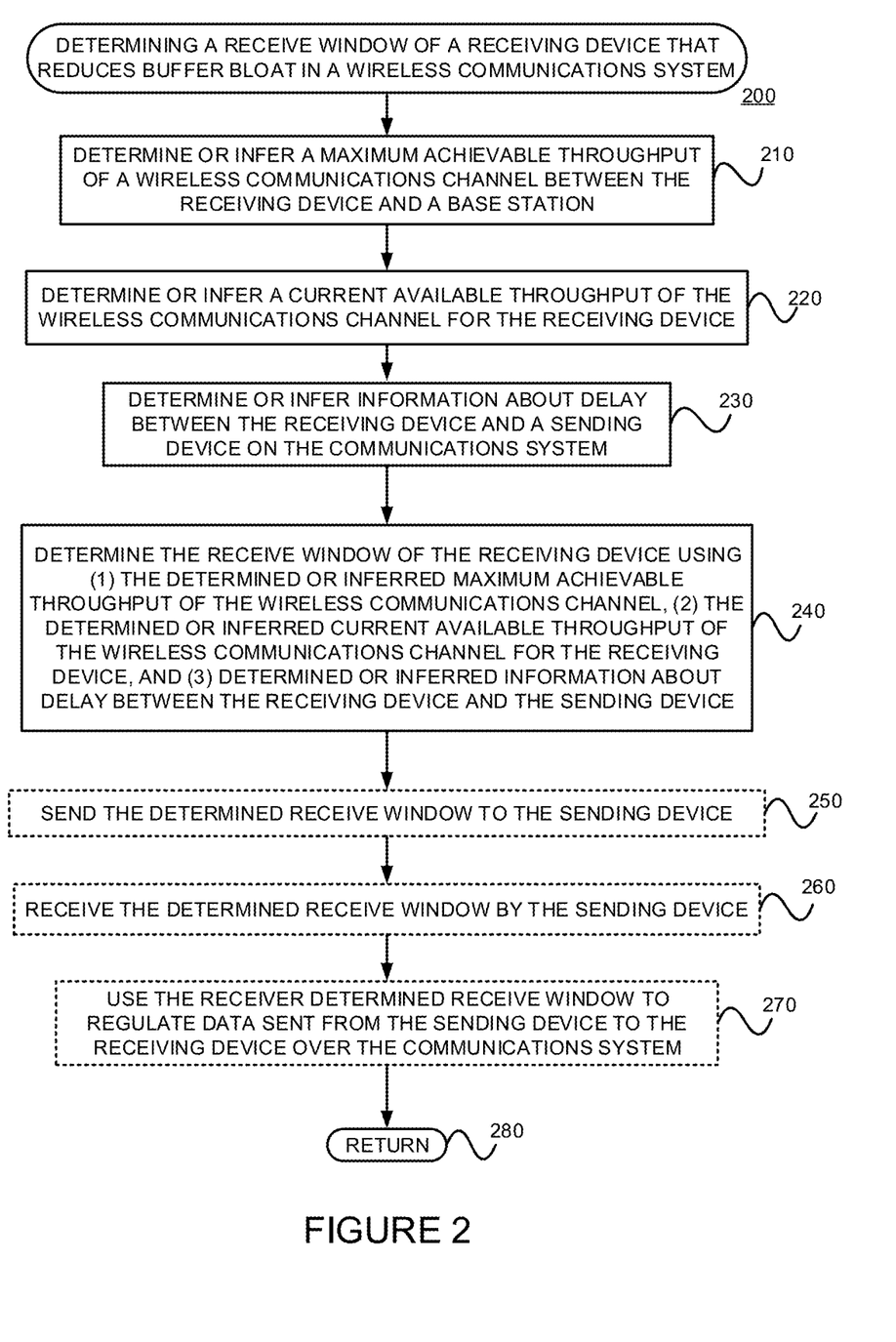
FIG. 2 is a flow diagram of an example method 200 for determining a receive window of a receiving device that reduces bufferbloat in a wireless communications system, such as the example system of FIG. 1.

FIG. 2 is a flow diagram of an example method 200 for determining a receive window of a receiving device that reduces bufferbloat in a wireless communications system, such as the example system 100 of FIG. 1. The wireless communications system includes a receiving device (e.g., mobile device 110), a sending device (e.g., second device 120), and a communications network (e.g., Internet 150) including a base station (e.g., 140) in wireless communication with the receiving device over a wireless communications channel (e.g., 130). The example method 200 (i) determines or infers a maximum achievable throughput of the wireless communications channel (Block 210), (ii) determines or infers a current available throughput of the wireless communications channel for the receiving device (Block 220), and (iii) determines or infers information about delay between the receiving device and the sending device (Block 230). The method 200 then determines the receive window of the receiving device using (i) the determined or inferred maximum achievable throughput of the wireless communications channel, (ii) the determined or inferred current available throughput of the wireless communications channel for the receiving device, and (iii) determined or inferred information about delay between the receiving device and the sending device.

Once determined, the receive window may then be communicated to the sending device. (Block 250) When the sending device receives the determined receive window (Block 260), it may then use it to regulate data sent from the sending device to the receiving device (Block 270).

In some example methods consistent with the present description, the maximum achievable throughput of the wireless communications channel is inferred from receiving power measured by the receiving device. In other example methods consistent with the present description, the maximum achievable throughput of the wireless communications channel is inferred from a signal-to-interference-plus-noise ratio ("SINR") determined by the receiving device. In still other example methods consistent with the present description, the maximum achievable throughput of the wireless communications channel is determined from a media access control ("MAC") layer downlink control message ("DCI"). In yet other example methods consistent with the present description, the maximum achievable throughput of the wireless communications channel is inferred from Channel quality indicator ("CQI") generated by the receiving device after decoding pilots. In still yet other example methods consistent with the present description, the maximum achievable throughput of the wireless communications channel is inferred from receiving power measured by the receiving device, and the current available throughput of the wireless communications channel for the receiving device is inferred from dividing total received bytes in measured interval by the interval. Alternatively, the maximum achievable throughput of the wireless communications channel may be inferred from a combination of (e.g., a weighted average, or some other linear, polynomial, or exponential function of) two or more of the foregoing.

In some example methods consistent with the present description, the current available throughput of the wireless communications channel for the receiving device is inferred from dividing total received bytes in a measured time interval by the interval. In some such example methods, the total received bytes is measured in one or more of (A) an application layer between the receiving device and the sending device, (B) a transport layer between the receiving device and the sending device, (C) a network layer between the receiving device and the sending device, (D) a data-link layer between the receiving device and the sending device, and/or (E) a physical layer between the receiving device and the sending device. In some example methods consistent with the present description, the current available throughput of the wireless communications channel for the receiving device is determined from a media access control ("MAC") layer downlink control message ("DCI").

In some example methods consistent with the present description, the information about delay between the receiving device and the sending device includes a round trip time ("RTT") and a minimum RTT. In some such example methods, the receive window of the receiving device is determined by (1) determining whether or not the RTT is in a low latency region, and (2) responsive to a determination that the RTT is in a low latency region, calculating the receive window as a function of (i) the maximum achievable throughput of the wireless communications channel and (ii) a minimum RTT, and otherwise, responsive to a determination that the RTT is not in a low latency region, calculating the received window as a function of (i) the current available throughput and (ii) the minimum RTT. In some such embodiments, the determination of whether or not the RTT is in a low latency region may be determined by comparing a current RTT with a threshold defined as a minimum RTT plus a constant.

In some example embodiments consistent with the present description, the wireless communications system includes a proxy (e.g., 160) located at the base station, or in a server near the base station. The proxy has access to the current available throughput and the maximum achievable throughput from the base station, and the proxy can measure a delay between the sending device and the proxy, and a delay between the proxy and the receiving device. In some such example embodiments, the proxy may infer the minimum RTT between the sending device and the receiving device.

In some example methods consistent with the present description, the information about delay between the receiving device and the sending device includes an RTT and a minimum RTT. In some such example methods, the receive window of the receiving device is determined as:

$$w*\text{maximum achievable throughput}*\text{RTTmin}+(1-w)*\text{current available throughput}*\text{RTTmin},$$

where w is a function of RTT and RTTmin. In some such embodiments, the wireless communications system includes a proxy located at the base station, or in a server near the base station, and the example method further inspects and changes, by the proxy, the receive window calculated at the receiving device, to generate a new receive window. The new receive window is then forwarded (e.g., using the proxy) to the sender.

In some example methods consistent with the present invention, the acts of (i) determining or inferring a maximum achievable throughput of the wireless communications channel (Block 210), (ii) determining or inferring a current available throughput of the wireless communications channel for the receiving device (Block 220), and (iii) determining or inferring information about delay between the receiving device and the sending device (Block 230) are repeated, thereby providing a dynamically determined receive window.

Simulation Results of Example Methods

Optimal bandwidth: Thanks to downlink control messages (DCI) messages, which contain the transport block (TB) size (i.e., the effective number of bits that will be delivered to each UE), users can estimate the allocated bandwidth. As noted above, if the entire bandwidth is used, such as ABRWDA, the RW is overestimated when multiple UEs are active. On the other hand, if the effective allocated bandwidth is fed back, if the UE capacity suddenly drops, the sender limits its delivery rate, consequently underutilizing the wireless link when it transitions to a better condition. When the congestion did not take place in the wireless link, the base station also allocates less resources to the UE, and the UE feeds back a smaller RW. When the congestion is gone, the sender is still limited by the small RW, and this entails low utilization. Therefore, picking either one as the reference bandwidth is not optimal. However, example methods consistent with the present description use the entire bandwidth when the RTT is within a low latency region, which is [RTTmin, RTTmin+δ] since the TCP socket can infer there is no bufferbloat issue. Conversely, if the RTT is not operating in the low latency region, the allocated bandwidth is selected to have a more conservative sending rate, in order to mitigate the delay. (In simulations performed by the present inventors, δ was set to be 10 ms because it showed good performance in terms of utilization and delay.)

Optimal delay: Some example methods consistent with the present description measure the receiver side RTT when TCP timestamp is on with the method described in the article H. Jiang, Y. Wang, K. Lee, and I. Rhee, "Tackling Bufferbloat in 3G/4G Networks," *Proceedings of the 2012 ACM Conference on Internet Measurement Conference*, ACM, 2012, pp. 329-342 (incorporated herein by reference). To prevent over-inflating the RW, using the end-to-end latency to compute the RW should be avoided. Instead, the correct latency should be the delay between the remote host to the UE with an empty buffer. As discussed in the article, X. Liu, F. Ren, R. Shu, T. Zhang, and T. Dai, "Mitigating Bufferbloat With Receiver-Based TCP Flow Control Mechanism in Cellular Networks" (incorporated herein by reference), one simple solution is selecting the min RTT. It is reasonable to assume that, if no multi-path TCP is used, the core network latency should be relatively stable and by selecting the min RTT, one can find the RTT of an empty buffer. The present inventors conducted the same experiments performed in Sec. II of the '453 provisional, as reported in FIG. 1 and FIG. 2 of the '453 provisional. The RW is dynamically updated based on the optimal bandwidth-delay product. The DRW was found to outperform CoDel by having much higher throughput and roughly the same delay.

Example Apparatus

Figure 3:
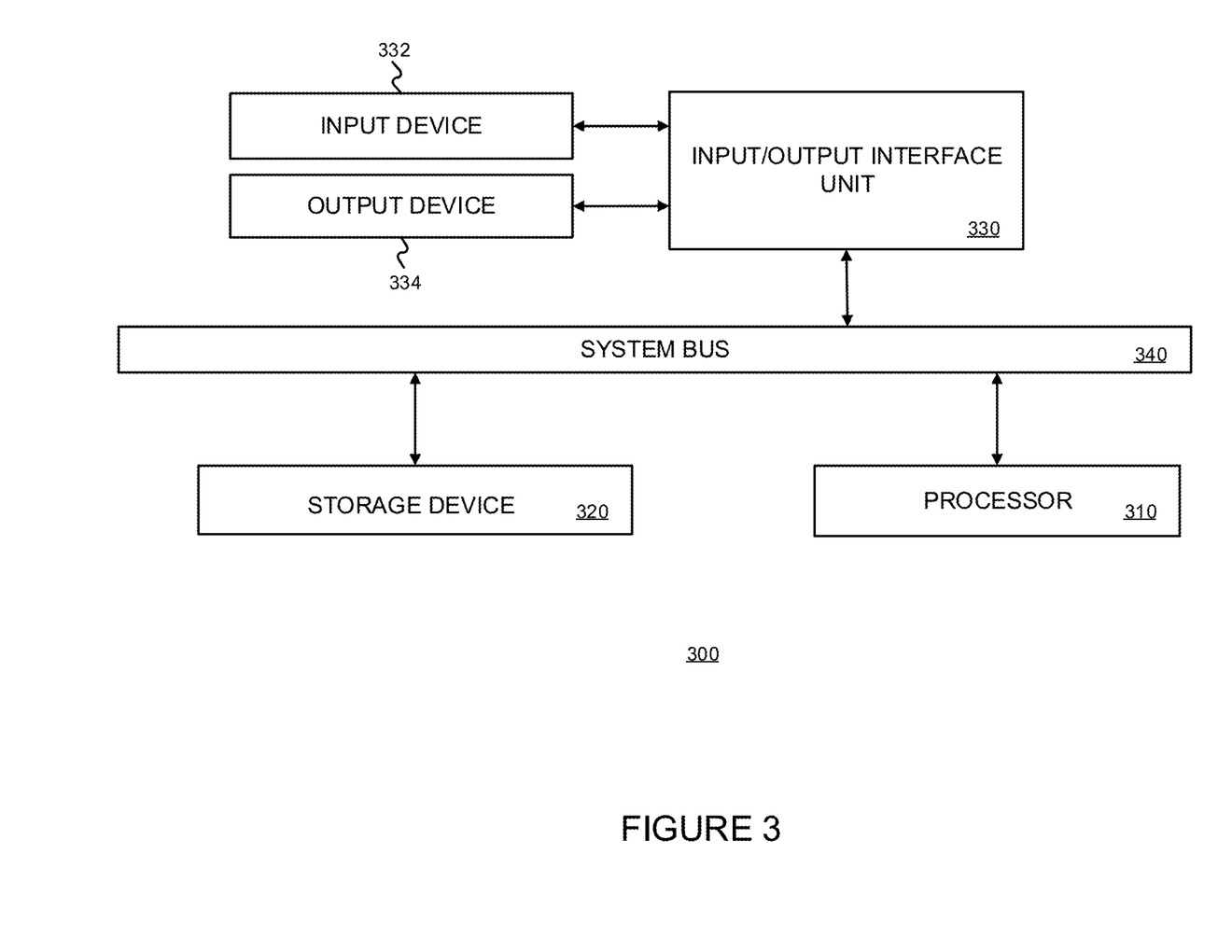
FIG. 3 is a block diagram of an example apparatus which may be used to implement example methods consistent with the present description, and to store information or instructions used and/or generated by such example methods.

Example embodiments consistent with the present disclosure may be implemented on an example system 300 as illustrated on FIG. 3. The example system 300 may be a piece of user equipment such as a mobile phone or tablet for example. Alternatively, the example system 300 may be a computing device (e.g., a server, a proxy, etc.) provided in a communications network. The example system 300 that may perform one or more of the methods described, and/or store information used and/or generated by such methods. The example system 300 includes one or more processors 310, one or more input/output interface units 330, one or more storage devices 320, and one or more system buses and/or networks 340 for facilitating the communication of information among the coupled elements. One or more input devices 332 and one or more output devices 334 may be coupled with the one or more input/output interfaces 330. The one or more processors 310 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 320 and/or may be received from an external source via one or more input interface units 330. The machine executable instructions may be stored as various software modules, each module performing one or more operations. Functional software modules are examples of components of the invention.

In some embodiments consistent with the present disclosure, the processors 310 may be one or more microprocessors and/or ASICs. The bus 340 may include a system bus. The storage devices 320 may include system memory, such as read only memory (ROM) and/or random access memory (RAM). The storage devices 320 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor.

Refinements, Alternative and Extensions

Among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, "section," "unit," "component," "element," "module," "device," "member," "mechanism," "apparatus," "machine," or "system" may be implemented as circuitry, such as integrated circuits, application specific circuits ("ASICs"), a field programmable gate arrays ("FPGAs"), field programmable logic arrays ("FPLAs"), etc., and/or software implemented on one or more processors, such as a microprocessor(s). For example, apparatus for performing any of the methods consistent with the present invention may include at least one of (A) a processor executing stored program instructions, (B) an ASIC, (C) an FPGA, and/or (D) a FPLA. A tangible computer-readable storage medium may be used to store instructions, which, when executed by at least one processor, perform any of the foregoing methods. The present invention is not limited to the example embodiments described above, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

Short Flows

A realistic use scenario would be a user web browsing and texting while a background file is downloading. To test how a dynamic RW mechanism consistent with the present description improves the user experience, the present inventors simulated a long TCP flow along with some short TCP flows, which are randomly distributed. This experiment was repeated with normal RW (both Drop-tail and CoDel queue) and dynamic RW consistent with the present description. The rate plots are provided in FIG. 3. These plots show that the both dynamic RW and CoDel might be able to reduce the delay, but only dynamic RW consistent with the present description can do so while still maintaining high throughput.

Multiple Users

Figure 4:
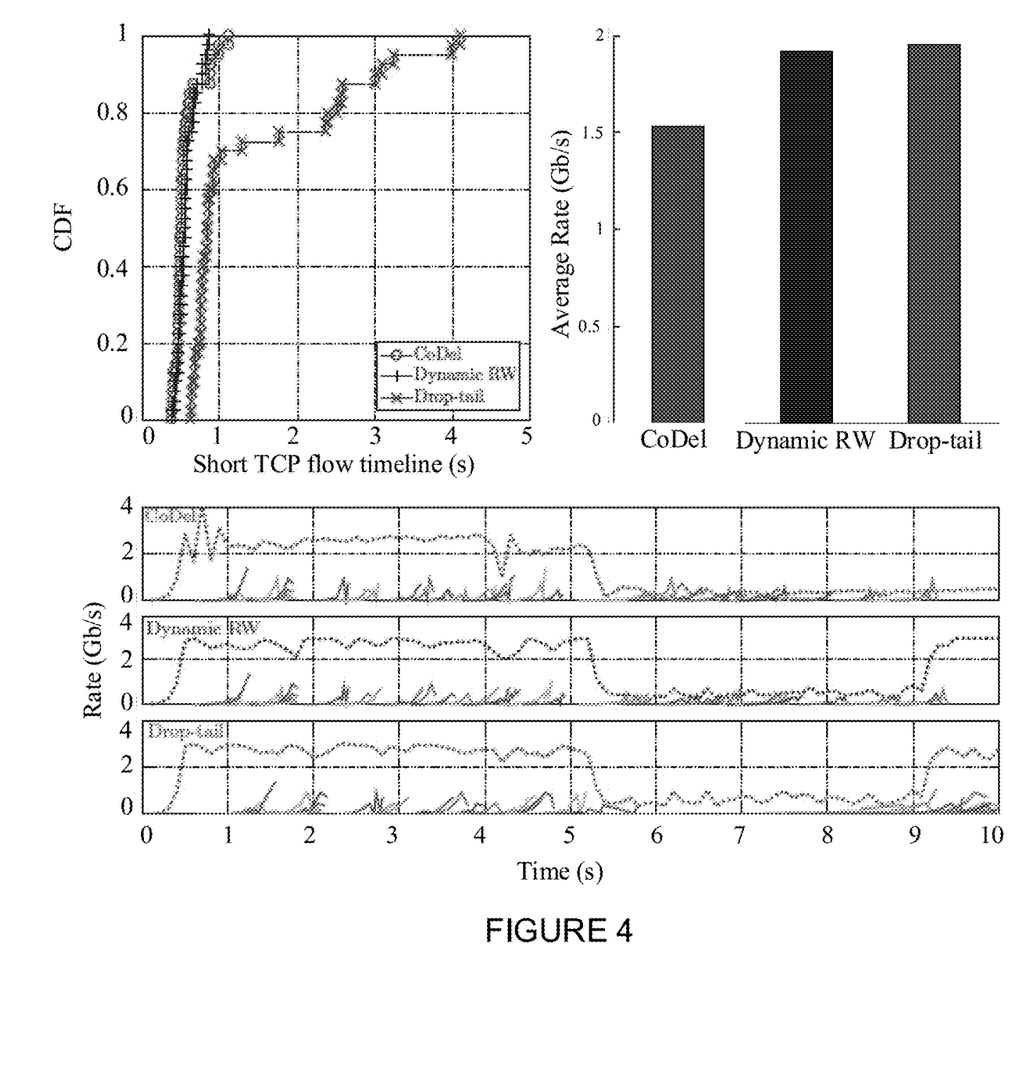
FIG. 4 is a rate plot for normal RW (both Drop-tail and CoDel queue) and improved DRW consistent with the present description applied with a simulated a long TCP flow along with some short TCP flows, which are randomly distributed.

As just noted in the previous section with reference to FIG. 3, DRW consistent with the present description outperforms Drop-tail and CoDel in single UE case. Note that in single UE scenario, ABRWDA should have similar performance as DRW since allocated bandwidth almost equals total data bandwidth. The present inventors also studied the behavior of multiple UEs connected to the same base station. More specifically, four (4) connections between four (4) remote hosts and four (4) UEs were established, with the TCP flows going through the same base station. Two (2) of the UEs were always line-of-sight (LoS), while the other two (2) UEs experienced LoS-NonLoS-LoS transitions. The resources were allocated to UEs with round-robin scheduling decision. The average throughput versus delay is plotted in FIG. 4. For the two (2) LoS UEs, CoDel and DRW have the least delay and almost the same throughput compared to the other two methods. Nonetheless, for the two (2) LoS-NonLoS-LoS UEs, DRW consistent with the present description shows the best performance.

Figure 5:
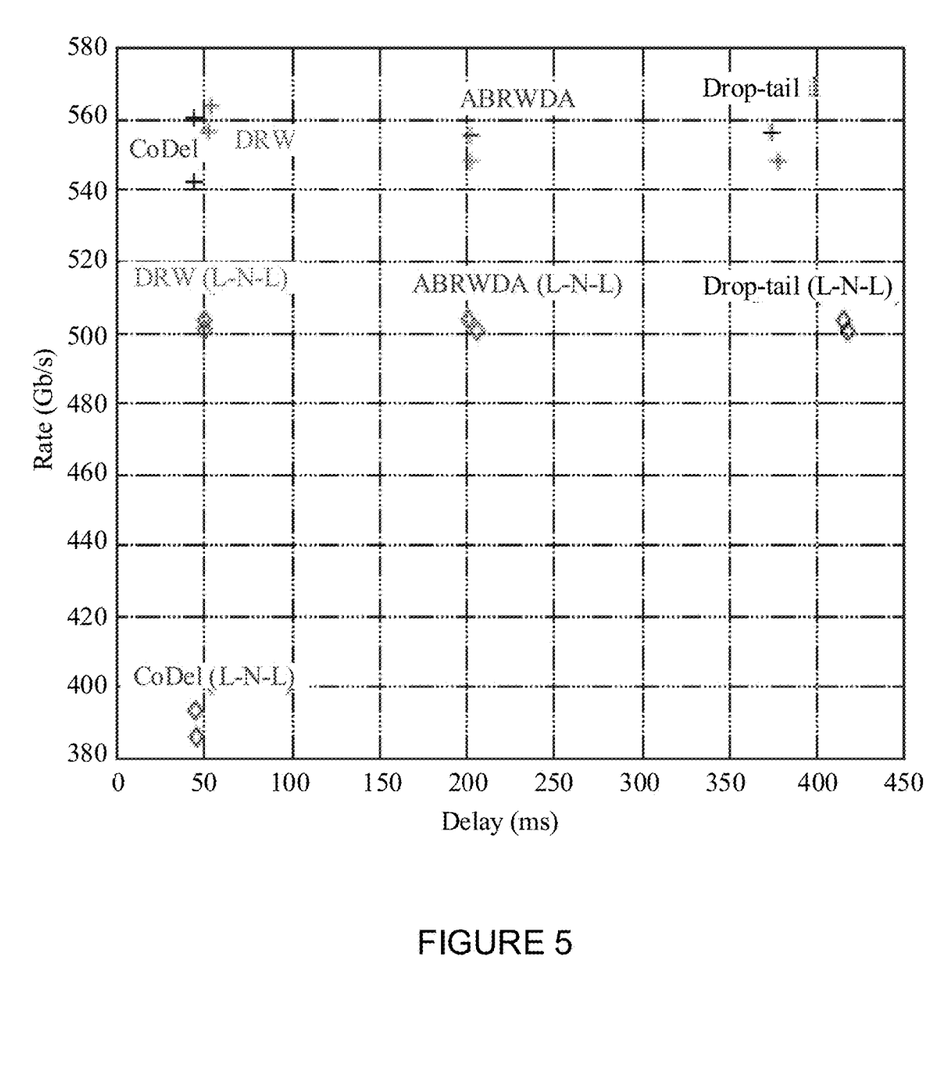
FIG. 5 is a plot of average throughput versus delay in simulations in which multiple UEs are connected to the same base station.
Figure 6:
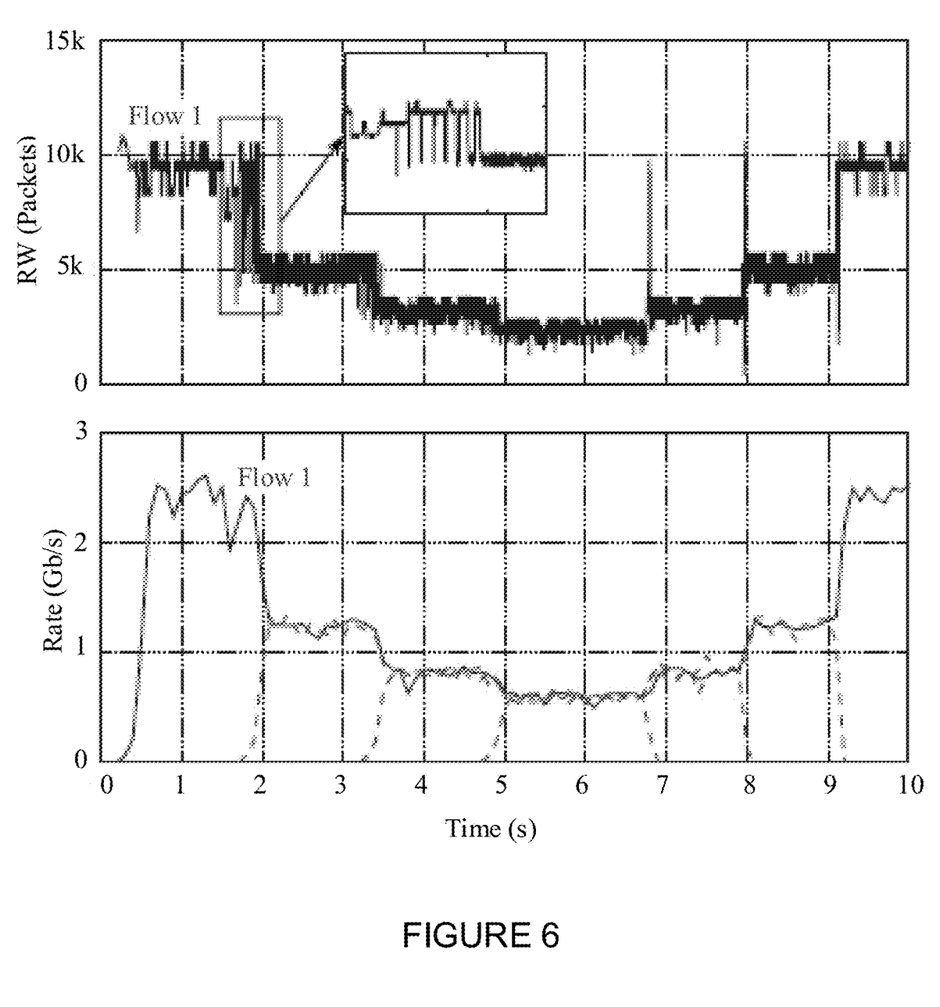
FIG. 6 includes plots which illustrate how the RW of one flow reacts when other UEs join or leave a shared cell.

To discover the reason why DRW consistent with the present description can achieve such a low latency while maintaining good throughput, the present inventors conducted the following experiment. In one cell, one (1) UE is always connecting, and three (3) other UEs joined and left the cell at different moments. Each UE established one TCP flow. The plots of FIG. 5 show how the RW of flow 1 reacts when other UEs join or leave the cell. More specifically, when a new UE arrives, the RW starts bouncing between the upper bound (RTTmin times total data bandwidth) and lower bound (RTTmin times allocated bandwidth), and then finally becomes stable as the rate of new UE ramps up and share more bandwidth. At 7 s, 8 s, and 9 s, when a UE leaves, the delay decreases quickly and the RW jumps back to the upper bound. Due to the RW inflating behavior, all remaining UEs informed the sender to inject more packets and caused the base station to increase to the allocated bandwidth for all the remaining UEs. Because the RW is larger than the optimal window now, the delay will also increase and cause the RW to fall back to the new lower bound—bandwidth divided by the remaining UEs, as shown FIG. 5.

Bufferbloat Over Uplink

In the uplink, the UE is the sender. As a result, the link capacity is known at the UE side itself (via the DCI allocations). Hence, if a cross-layer design is possible, where the UE MAC layer information can be exposed to the TCP sender on the same device, the TCP sender can directly adjust the congestion window.

CONCLUSIONS

Bufferbloat can be severe problem for mmWave cellular systems due to the high variability of the channel combined with the delays in the cellular core network. Moreover, conventional AQM techniques are unable to mitigate the bufferbloat problems effectively. In contrast, improved DRW methods consistent with the present description can greatly reduce delays, with minimal loss in throughput. Some example methods expose MAC layer information (DL or UL grants in the DCI messages) to the TCP process at the UE. Properly using channel information at the UE can dramatically improve end-to-end performance with relatively simple changes.

What is claimed is:

1. For use in a wireless communications system including a receiving device, a sending device, and a communications network including a base station in wireless communication with the receiving device over a wireless communications channel, a computer-implemented method for determining a receive window of the receiving device that reduces bufferbloat in the wireless communications system, the method comprising:
 a) determining or inferring a maximum achievable throughput of the wireless communications channel;
 b) determining or inferring a current available throughput of the wireless communications channel for the receiving device;
 c) determining or inferring information about delay between the receiving device and the sending device; and
 d) determining the receive window of the receiving device using (1) the determined or inferred maximum achievable throughput of the wireless communications channel, (2) the determined or inferred current available throughput of the wireless communications channel for the receiving device, and (3) determined or inferred information about delay between the receiving device and the sending device,
  wherein the information about delay between the receiving device and the sending device includes a round trip time (RTT) and a minimum RTT, and wherein the receive window of the receiving device is determined by
 1) determining whether or not the RTT is in a low latency region, and
 2) responsive to a determination that the RTT is in a low latency region, calculating the receive window as a function of (i) the maximum achievable throughput of the wireless communications channel and (ii) a minimum RTT, and otherwise, responsive to a determination that the RTT is not in a low latency region, calculating the received window as a function of (i) the current available throughput and (ii) the minimum RTT.

2. The computer-implemented method of claim 1 further comprising:
 e) sending the determined receive window to the sending device.

3. The computer-implemented method of claim 2 further comprising:
 f) receiving the determined receive window by the sending device; and
 g) using the receiver determined receive window to regulate data sent from the sending device to the receiving device.

4. The computer-implemented method of claim 1 wherein the maximum achievable throughput of the wireless communications channel is inferred from receiving power measured by the receiving device.

5. The computer-implemented method of claim 1 wherein the maximum achievable throughput of the wireless communications channel is inferred from a signal-to-interference-plus-noise ratio ("SINR") determined by the receiving device.

6. The computer-implemented method of claim 1 wherein the maximum achievable throughput of the wireless communications channel is determined from a media access control ("MAC") layer downlink control message ("DCI").

7. The computer-implemented method of claim 1 wherein the maximum achievable throughput of the wireless communications channel is inferred from Channel quality indicator (CQI) generated by the receiving device after decoding pilots.

8. The computer-implemented method of claim 1 wherein the current available throughput of the wireless communications channel for the receiving device is inferred from dividing total received bytes in measured interval by the interval.

9. The computer-implemented method of claim 8 wherein the total received bytes is measured in application layer between the receiving device and the sending device.

10. The computer-implemented method of claim 8 wherein the total received bytes is measured in transport layer between the receiving device and the sending device.

11. The computer-implemented method of claim 8 wherein the total received bytes is measured in network layer between the receiving device and the sending device.

12. The computer-implemented method of claim 8 wherein the total received bytes is measured in data-link layer between the receiving device and the sending device.

13. The computer-implemented method of claim 8 wherein the total received bytes is measured in physical layer between the receiving device and the sending device.

14. The computer-implemented method of claim 1 wherein the current available throughput of the wireless communications channel for the receiving device is determined from a media access control ("MAC") layer downlink control message ("DCI").

15. The computer-implemented method of claim 1 wherein the maximum achievable throughput of the wireless communications channel is inferred from receiving power measured by the receiving device, and wherein the current available throughput of the wireless communications channel for the receiving device is inferred from dividing total received bytes in measured interval by the interval.

16. The computer-implemented method of claim 1 wherein the determination of whether or not the RTT is in a low latency region is determined by comparing a current RTT with a threshold defined as a minimum RTT plus a constant.

17. The computer-implemented method of claim 1 wherein the wireless communications system includes a proxy located at the base station, or in a server near the base station, wherein the proxy has access to the current available throughput and the maximum achievable throughput from the base station, and wherein the proxy can measure a delay between the sending device and the proxy, and a delay between the proxy and the receiving device, the method further comprising:
 inferring, with the proxy, the minimum RTT between the sending device and the receiving device.

18. The computer-implemented method of claim 1 wherein the information about delay between the receiving device and the sending device includes a round trip time (RTT) and a minimum RTT, and wherein the receive window of the receiving device is determined as:

$$w*\text{maximum achievable throughput}*\text{RTTmin}+(1-w)*\text{current available throughput}*\text{RTTmin},$$

where w is a function of RTT and RTTmin.

19. The computer-implemented method of claim 18 wherein the wireless communications system includes a proxy located at the base station, or in a server near the base station, the method further comprising:

inspecting and changing, by the proxy, the receive window calculated at the receiving device, to generate a new receive window; and forwarding the new receive window to the sender.

20. The computer-implemented method of claim 1 wherein the acts of (a)-(c) are repeated, thereby providing a dynamically determined receive window.

21. Apparatus for use in a wireless communications system including a receiving device, a sending device, and a communications network including a base station in wireless communication with the receiving device over a wireless communications channel, for determining a receive window of the receiving device that reduces bufferbloat in the wireless communications system, the apparatus comprising:

a) a communications interface; and b) at least one of (A) a processor executing stored program instructions, (B) an application specific integrated circuit, (C) a field programmable gate array, or (D) a field programmable logic array, configured to perform a method including
1) determining or inferring a maximum achievable throughput of the wireless communications channel,
2) determining or inferring a current available throughput of the wireless communications channel for the receiving device,
3) determining or inferring information about delay between the receiving device and the sending device, and
4) determining the receive window of the receiving device using (i) the determined or inferred maximum achievable throughput of the wireless communications channel, (ii) the determined or inferred current available throughput of the wireless communications channel for the receiving device, and (iii) determined or inferred information about delay between the receiving device and the sending device,
wherein the information about delay between the receiving device and the sending device includes a round trip time (RTT) and a minimum RTT, and
wherein the receive window of the receiving device is determined by
i) determining whether or not the RTT is in a low latency region, and
ii) responsive to a determination that the RTT is in a low latency region, calculating the receive window as a function of (1) the maximum achievable throughput of the wireless communications channel and (2) a minimum RTT, and otherwise, responsive to a determination that the RTT is not in a low latency region, calculating the received window as a function of (1) the current available throughput and (2) the minimum RTT.

22. A non-transitory computer-readable storage medium storing instructions, which when executed by at least one processor, cause the at least one processor to perform a method for use in a wireless communications system including a receiving device, a sending device, and a communications network including a base station in wireless communication with the receiving device over a wireless communications channel, a computer-implemented method for determining a receive window of the receiving device that reduces bufferbloat in the wireless communications system, the method comprising:

a) determining or inferring a maximum achievable throughput of the wireless communications channel;

b) determining or inferring a current available throughput of the wireless communications channel for the receiving device;

c) determining or inferring information about delay between the receiving device and the sending device;

d) determining the receive window of the receiving device using (1) the determined or inferred maximum achievable throughput of the wireless communications channel, (2) the determined or inferred current available throughput of the wireless communications channel for the receiving device, and (3) determined or inferred information about delay between the receiving device and the sending device, wherein the information about delay between the receiving device and the sending device includes a round trip time (RTT) and a minimum RTT, and wherein the receive window of the receiving device is determined by 1) determining whether or not the RTT is in a low latency region, and 2) responsive to a determination that the RTT is in a low latency region, calculating the receive window as a function of (i) the maximum achievable throughput of the wireless communications channel and (ii) a minimum RTT, and otherwise, responsive to a determination that the RTT is not in a low latency region, calculating the received window as a function of (i) the current available throughput and (ii) the minimum RTT.

\* \* \* \* \*